United States Patent [19]
Day

[11] Patent Number: 4,585,608
[45] Date of Patent: Apr. 29, 1986

[54] DEVICE FOR THE DETERMINATION OF THE VIBRATIONS OCCURRING AT THE INTERNALS OF A REACTOR PRESSURE VESSEL

[75] Inventor: Bobby L. Day, Walldorf, Fed. Rep. of Germany

[73] Assignee: Brown Boveri Reaktor GmbH, Mannheim, Fed. Rep. of Germany

[21] Appl. No.: 383,405

[22] Filed: Jun. 1, 1982

[51] Int. Cl.$^4$ .............................................. G21C 17/00
[52] U.S. Cl. ................................... 376/245; 376/258; 73/590; 73/661
[58] Field of Search ................. 376/245, 258; 73/623, 73/661, 590

[56] References Cited

U.S. PATENT DOCUMENTS

| | | | |
|---|---|---|---|
| 3,264,863 | 8/1966 | Maropis | 376/245 |
| 3,766,005 | 10/1973 | Erkens | 376/245 |
| 3,860,480 | 1/1975 | Carteus et al. | 376/245 |
| 3,860,481 | 1/1975 | Gopal et al. | 376/245 |
| 3,913,407 | 10/1975 | Hanff et al. | 376/245 |
| 4,194,400 | 3/1980 | Staff | 73/623 |
| 4,304,629 | 12/1981 | Byford | 376/245 |
| 4,368,642 | 1/1983 | Carodiskey | 73/623 |
| 4,392,214 | 7/1983 | Marini et al. | 376/245 |

FOREIGN PATENT DOCUMENTS

| | | |
|---|---|---|
| 2700342 | 7/1977 | Fed. Rep. of Germany . |
| 2828541 | 1/1980 | Fed. Rep. of Germany . |
| 1293109 | 10/1972 | United Kingdom . |
| 1426267 | 2/1976 | United Kingdom . |

*Primary Examiner*—Salvatore Cangialosi
*Attorney, Agent, or Firm*—Robert J. Edwards; Mark B. Quatt; D. Neil LaHaye

[57] ABSTRACT

In a device for the determination of the vibrations occurring at the internals of a reactor pressure vessel, it is possible to perform the maintenance of the vibration detector located in a housing from outside the reactor pressure vessel. One end of a guide tube is fed through a pipe stub to a receptacle cone connected to the core internals. The end of the guide tube facing away from the reactor pressure vessel is cup-shaped and is sealed with a cover. A flexible rod is connected to the housing and its other end extends into the cup-shaped end of the guide tube. The flexible rod and with it the housing connected to it can be inserted into the receptacle cone, providing good transmission of the vibrations prevailing at the internals, which reach an evaluation unit through the cable.

10 Claims, 7 Drawing Figures

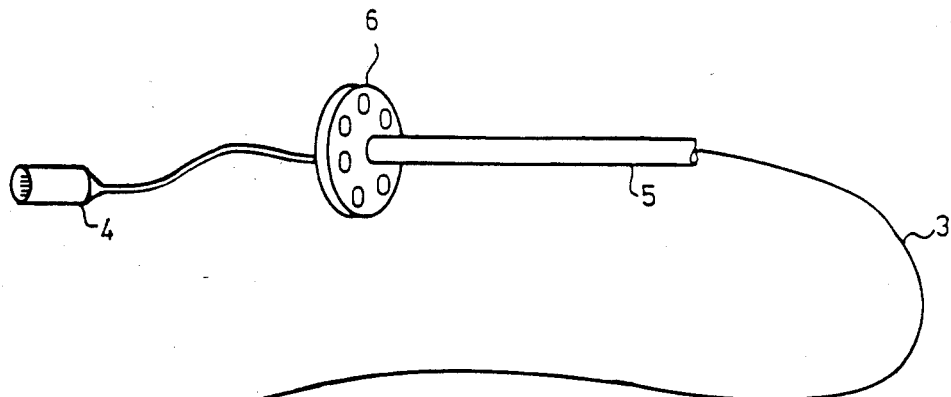
Fig. 1a
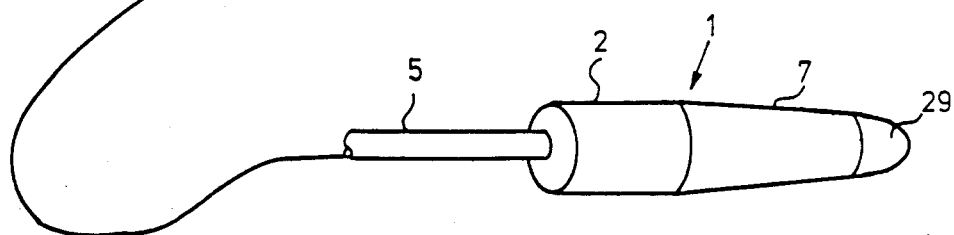
Fig. 1b
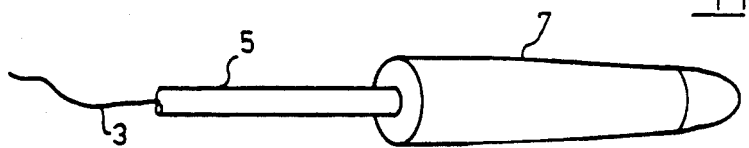
Fig. 1c
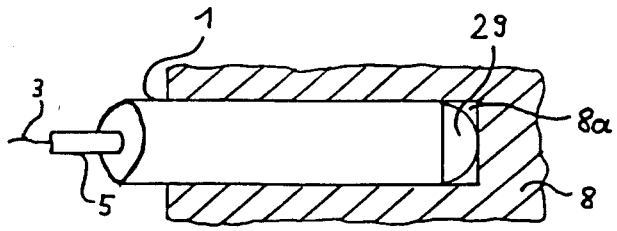

DEVICE FOR THE DETERMINATION OF THE VIBRATIONS OCCURRING AT THE INTERNALS OF A REACTOR PRESSURE VESSEL

BACKGROUND

The present invention relates to a device for the determination of the vibrations occurring at the internals of a reactor pressure vessel by the use of a deflection detector connected to the internals.

The lifetime of deflection detectors inside a reactor pressure vessel is not very long because of the high temperatures, radioactivity levels, and pressures prevailing there. For this reason, their use over the entire operating period of a reactor system of about forty years is not possible.

A devie is known from German Patent Application No. 2,532,247 in which the vibrations are determined with a seismic deflection detector. The deflection detector for this purpose is bolted to the structural components to be monitored. In the replacement or repair of the deflection detector during the annual fuel assembly replacement taking place with the reactor pressure vessel opened, a substantial radiation exposure of the operating personnel must be expected when used in the area of the reactor pressure vessel internals. Furthermore, installation and removal with pole-like tools to cross the distance provided by a shielding layer of water is involved and time-consuming.

It is therefore the purpose of this invention to describe a device of the type mentioned initially by the use of which a direct vibration measurement and the installation and removal of the deflection detector with the reactor pressure vessel closed is possible, while avoiding the indicated drawbacks.

SUMMARY OF THE INVENTION

This problem is solved according to the present invention by locating the deflection detector in a housing movable in a guide tube extending to the internals, by the fact that the guide tube opens into a receptacle connected to the internals, and that the housing is held in this receptacle.

This solution has the advantage that the installation and removal of the deflection detector occurs through the guide tube with the reactor pressure vessel closed. This provides a substantial reduction of the radiological exposure of the operating personnel.

BRIEF DESCRIPTION OF THE DRAWINGS

The device is described with the use of various examples of embodiment and FIGS. 1-5. The Figures show:

FIG. 1a The housing with the deflection detector and with mechanical and electrical connecting elements, FIG. 1b Another design of the housing of FIG. 1a, FIG. 1c Another design of the housing, FIG. 2 An arrangement for checking the core internals from the bottom of the reactor pressure vessel, FIG. 3 An arrangement for assisting the joining force of the cone connection, FIG. 4 An arrangement for moving the deflection detector during the operation of the reactor, and FIG. 5 An arrangement for checking the core internals from the reactor pressure vessel cap.

DETAILED DESCRIPTION OF THE PREFERRED EMBODIMENT

Figure 2:
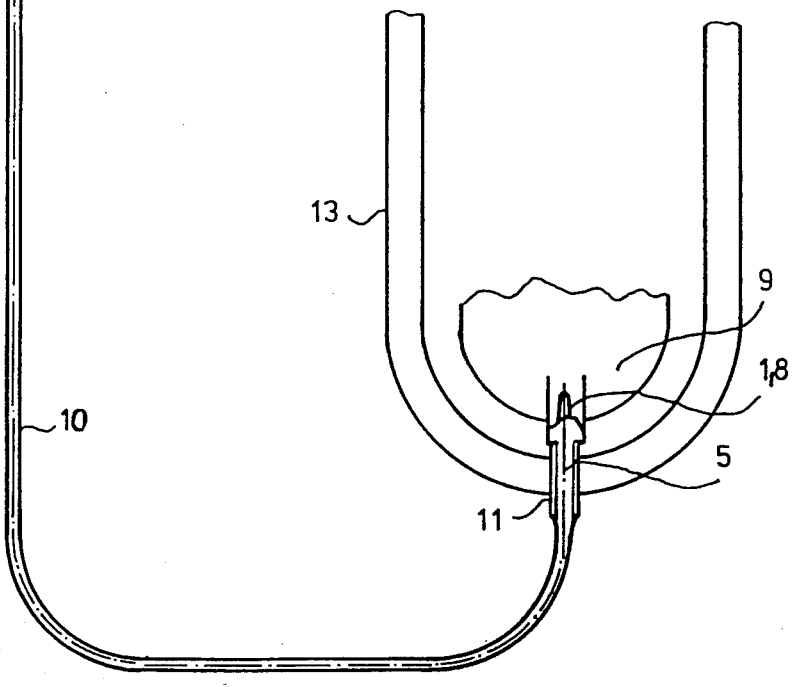

According to a preferred embodiment, the housing has a conical surface and the receptacle is equipped with a cone of the same slope.

The cone connection produces a large-area contact with no clearance between the internal components to be monitored, so that in addition to motions perpendicular to the axis of the housing, coaxial motions can also be determined.

In accordance with a particular embodiment, the surface of the housing has a partially conical and partially cylindrical shape and the deflection detector is located in the portion of the housing provided with a cylindrical surface.

Since the deflection detector is located beyond the conical housing section, a longer housing does result, but with smaller diameter. This version can therefore be used for internals which can be associated only with a receptacle of rather small diameter, or with which the guide tube does not permit larger diameters.

If materials with different coefficients of thermal expansion are used for the two structural components in a design with a conical connection between the housing and the receptacle, the adhesion is intensified at increased temperature, and the separation is facilitated with the system cooled down.

Another design of the connection between the receptacle and the housing provides for the jacket of the housing to be a cylinder, which extends into a hole in the receptacle, and provides that the coefficients of thermal expansion of the materials of the housing and the receptacle are chosen so that the housing can be moved in the axial direction in the hole in the receptacle when the reactor pressure vessel is not pressurized, and with rising temperature of the primary coolant located in the reactor pressure vessel, the surface of the housing and the inner surface of the hole in the receptacle are pressed against one another with increasing pressure.

In accordance with a preferred embodiment, the guide tube is connected to a pipe penetrating the pressure vessel, whose end facing away from the guide tube makes the connection to the receptacle.

A particular design provides that the end of the guide tube facing away from the reactor pressure vessel has a cup-shaped design and is connected with a sealing cover.

This produces the pressure-tight seal from the primary system in a simple manner.

The housing supporting the deflection detector is connected to a flexible rod. The rod extends into the cup-shaped end of the guide tube and is connected there to a yoke which can be subjected to a preset pressure through a spring supported on the cover, with a clearance existing between the yoke and the bottom of the cup-shaped end of the guide tube when there is a coupling connection between the receptacle and the housing.

The connection between the housing and the receptacle is provided with a uniform joining pressure by the use of this design. In addition, relative motions between the guide tube and the reactor pressure vessel can be compensated for. A motion of the housing in the guide tube is possible only when the cover of the cup-shaped end of the guide tube is opened.

Another embodiment provides that the area of the rod extending into the cup-shaped end of the guide tube is provided with a piston, that the piston can be moved together with the rod inside the cup-shaped end of the guide tube acting as a cylinder, and that the piston can be subjected to different pressures to control the motion.

With this embodiment, the housing with the deflection detector can be withdrawn from the receptacle, stationed in a region of the guide tube located outside the reactor pressure vessel, and reinserted in the receptacle during the operation of the reactor. Thus, the vibrations of the internals can be measured at periodic intervals. By withdrawing the housing out of the directly active area after completing the measurement, the lifetime of the deflection detector is increased.

To control the piston, the side of the piston facing the reactor pressure vessel is constantly subjected to the pressure prevailing in the latter, and the opposite side of the piston can be subjected to a pressure above or below this pressure.

The space above the side of the piston facing away from the reactor pressure vessel is optionally connected to the seal water supply of the reactor coolant pump or to its suction side.

Still another embodiment provides that the end of the guide tube away from the internals extends into a pipe stub penetrating the reactor pressure vessel and sealed from the outside, and a control rod drive is used to move the housing through a flexible rod connected to it.

The cable for transmitting the measured data from the deflection detector is preferably mounted along or through the flexible rod and reaches a plug-in coupler through the cover of the pressure-conducting enclosure of the end of the guide tube facing away from the internals.

Figure 3:
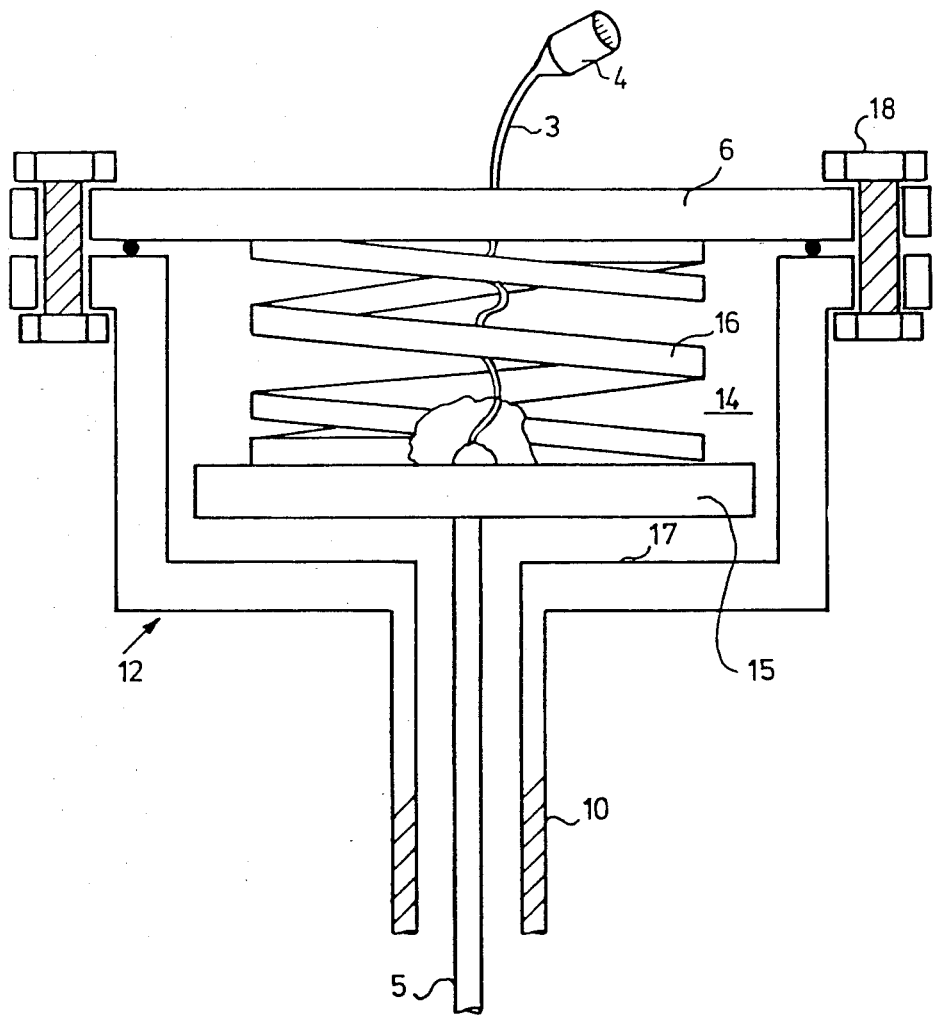

FIG. 1a shows a housing 1 to hold a deflection detector designed as an accelerometer detector. The deflection detector is accommodated in the cylindrical region 2 of the housing and is connected through the cable 3 to a plug-in coupler 4, which leads to an evaluation unit, not shown. The cable is mounted along a flexible rod 5 or through it, which extends from the housing to a cover 6. The housing also has a conical region 7 which has the same slope as the cone of a receptacle 8 rigidly connected to the core internals (FIGS. 2 and 3). The rounded tip 29 of the housing is used merely for centering it during the introduction into the receptacle.

In accordance with FIG. 1b, in addition to the rounded tip, the housing consists only of a conical region. The deflection detector in this case occupies the internal volume of the entire conical jacket. Depending on the space conditions prevailing at the core internals 9 and on the size of the inside diameter of the guide tube, the construction of FIG. 1a or 1b is used. Both designs of housing provide an easily loosened conical connection with the receptacle associated with the internals, which guarantees a sensitive vibration detection because of its relatively large transfer area.

FIG. 1c shows another design of the connection between the housing 1 and the receptacle 8. The jacket of the housing in this case represents a cylinder with rounded tip 29. The cylinder is located in a hole 8a in the receptacle 8, which is likewise cylindrical. In this case, a housing material is chosen with a higher coefficient of thermal expansion than that of the material of the receptacle. With no pressure in the reactor and with a low temperature of the primary coolant flowing around the receptacle, the cylindrical housing can move in the hole 8a in the receptacle. With increasing temperature, the expansion of the housing is greater than that of the receptacle 8. The clearance between the housing cylinder and the hole 8a is consumed, so that a force fit connection is formed between the components. During the operation of the reactor system, a direct transfer of the deflection of the internals therefore occurs, and when the system is shut down and the temperature of the primary coolant is correspondingly lower, the housing 1 can be readily withdrawn from the receptacle 8.

FIG. 2 shows the use of the housing on the internals 9. The entry of the housing in this case is made through a guide tube 10 introduced at the bottom of the reactor pressure vessel, which is fastened to a pipe 11 passing through the pressure vessel wall. The pipe is further extended to the internals and opens into a receptacle 8 connected firmly to them. The free end 12 of the guide tube has a cup-shaped design and is sealed pressure-tight with a cover 6. The cover forms the seal for the primary coolant which is located in the guide tube because of the connection to the reactor pressure vessel 13. The cable 3 for transmitting the signals of the deflection detector is passed through the cover in a sealed design, and reaches an evaluation unit, not shown, through a plug-in coupler 4. A flexible rod 5 is fastened to the housing 1 and is extended through the guide tube 10 to its cup-shaped end 12.

FIG. 3 shows the cup-shaped end 12 of the guide tube 10 in enlarged illustration. Into its inner volume 14 extends the end of the flexible rod 5 away from the housing 1, and is provided there with a dish-shaped yoke 15. A compression spring 16 is located between the yoke 15 and the cover 6 and presses the housing 1 through the flexible rod 5 into the receptacle 8. A clearance remains between the yoke and the bottom 17 of the cup-shaped end 12. Thus, a uniform closing pressure of the conical connection or of the tip 29 at the bottom of the hole 8a as in the design of FIG. 1c, and a compensation of the thermal expansion caused by the system components, are ensured. If the deflection detector located in the housing is to be exchanged or repaired with the reactor shut down, the screw connection 18 is loosened. The cover 6 and the flexible rod 5 together with the housing 1 and the yoke 15 are then removed from the guide tube and are installed in the reverse order after replacing the vibration detector. The maintenance personnel are thereby exposed to a substantially lower radiation load than in the case of a replacement made directly at the internals.

Figure 4:
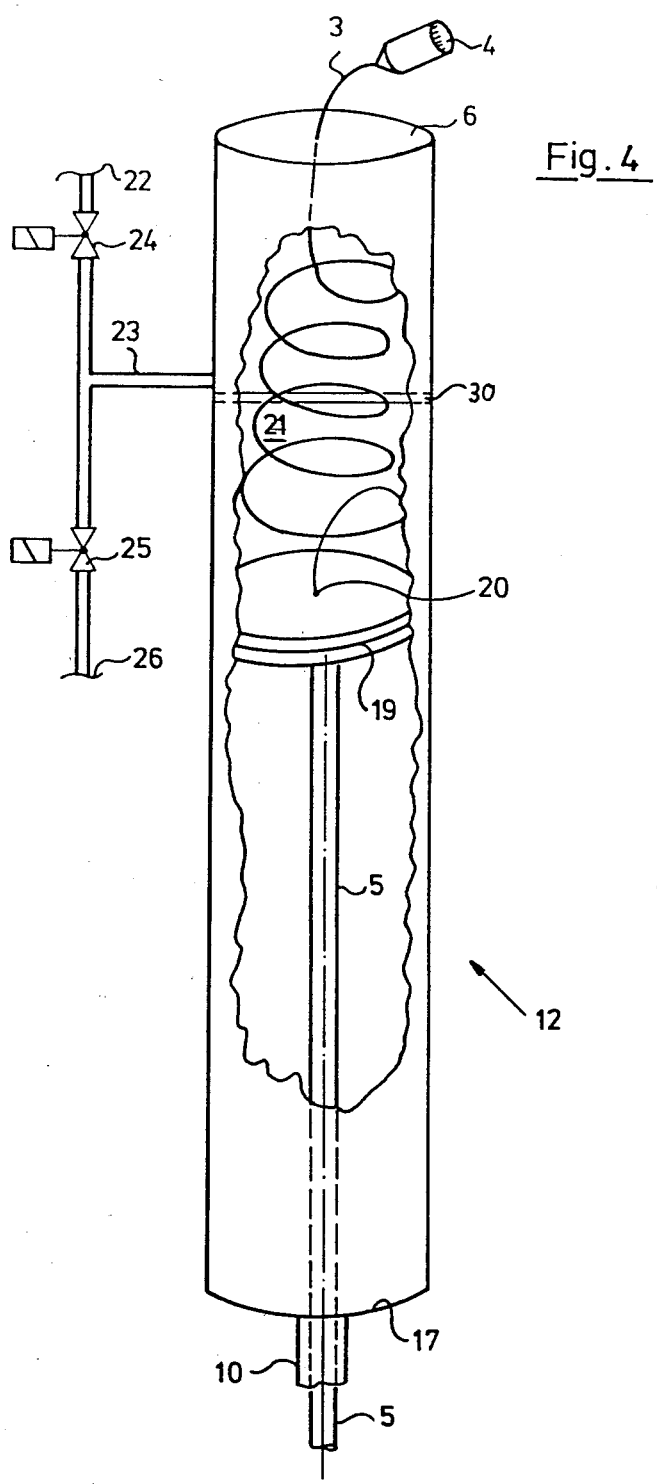

If a motion of the housing between its measurement position in the receptacle and a position in the guide tube outside the pressure vessel 13 should be necessary during the operation of the reactor, the design of a cup-shaped end of the guide tube 10 illustrated in FIG. 4 is used. In the cup-shaped end 12 acting as a cylinder is located a piston 19, which is connected to the flexible rod 5. The cable 3 reaches the plug-in coupler 4 through a piston opening 20 and through the cover 6. Up to the side of the piston facing the pressure vessel 13, the same pressure prevails in the guide tube as inside the pressure vessel. In the space 21 above the piston, either a higher or a lower pressure prevails than in the pressure vessel. A higher pressure brings about a motion of the housing into the receptacle and retention in this position. This higher pressure is produced by connection of the space 21 to the primary coolant seal water supply 22 of the reactor system through the line 23. The valve 24 is opened and the valve 25 is closed in this case. A clearance remains between the bottom of the piston and the bottom 17 of the cup-shaped end when there is a cone connection, in order to ensure a firm seating of the conical surfaces of the housing and receptacle. A lower pressure brings about a motion of the housing out of the receptacle until the piston 19 rests against the stop 30. Enough space remains above the stop 30 to hold the cable. The lower pressure mentioned is produced by the connection of the space 21 to the suction side 26 of the primary coolant pump through the line 23. In this case, the valve 25 is opened and the valve 24 is closed. The path traversable by the housing 1 during the operation of the reactor depends on the length of the cup-shaped end 12 of the guide tube 10. Because of the periodic use, the lifetime of the deflection detector and also its maintenance interval are lengthened. The design of FIG. 4 is suitable only for the conical housing design of FIGS. 1a and 1b, since the design of FIG. 1c illustrates a press fit connection during the operation of the reactor system.

Figure 5:
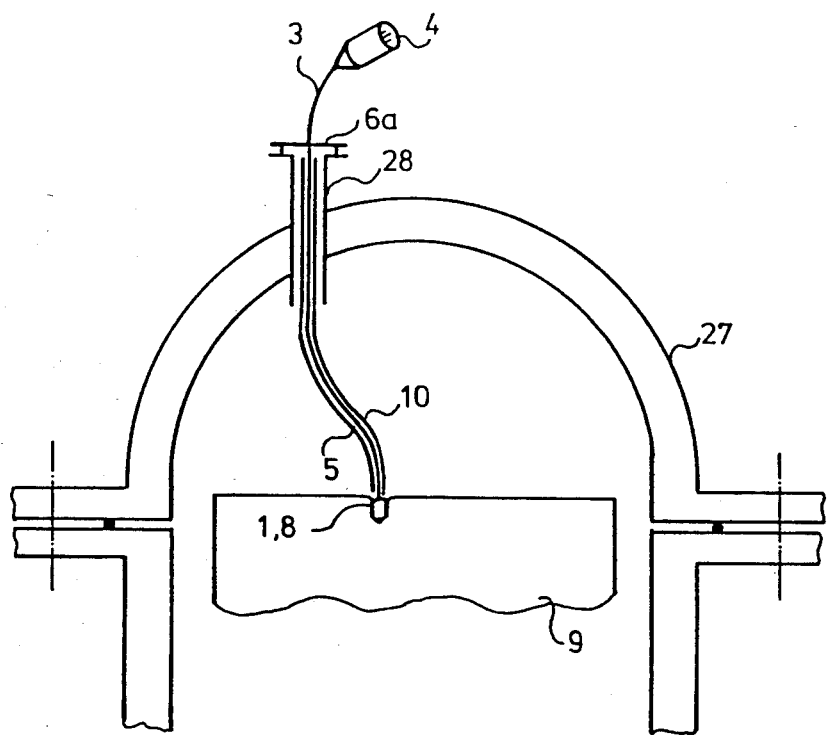

According to FIG. 5, the entry to the core internals 9 is made through the reactor pressure vessel cap 27. A pipe stub 28 penetrates through the pressure vessel cap and is connected to a cover 6a pressure-tight. The guide tube 10 for the travel of the housing 1 extends from the receptacle cone 8 at the core internals 9 to the pipe stub 28. Such pipe stubs are ordinarily used for the penetration the control rod assemblies. A drive for control rod assemblies, not illustrated, can be used for the motion of the flexible rod 5 with the housing 1 inside the guide tube until it connects with the receptacle. This design also can be used for periodic vibration measurement during the operation of the reactor. The curved guide tube 10 in combination with the flexible rod 5 permits bringing the housing into a receptacle 8 which is continued, not in a straight line, to the inlet of the guide tube 10 in the reactor pressure vessel.

With the device pursuant to the invention, both a continuous and a periodic determination of the deflection of core internals are possible in a simple manner. The radiation exposure of the maintenance personnel is thereby substantially reduced.

The embodiments of the invention in which an exclusive property or privilege is claimed are defined as follows:

1. A device for the determination of the vibrations occuring at the internals of a reactor pressure vessel by means of a deflection detector connected to the internals, comprising:
   a. a housing and a deflection detector arranged therein;
   b. a flexible rod attached to said housing;
   c. a guide tube that extends to the internals through the wall of said vessel which ends in a receptacle adapted to receive said housing and rigidly connected to the internals wherein the end of the guide tube facing away from the pressure vessel is cup-shaped and sealed by means of a cover; and
   d. said housing being mobile within said guide tube;
   e. a pipe penetrating the reactor pressure vessel and sealed from the outside having said guide tube connected through said pipe with the end of said guide tube in said pressure vessel facing away from said pipe connected to the receptacle; and
   f. a cable routed via the flexible rod and through the cover for transmitting the measuring results of the deflection detector to a plug-in coupler.

2. A device as in claim 1, wherein the housing has a conical shell surface, and the receptacle is provided with a cone of the same inclination.

3. A device as in claim 1, wherein the shell surface of the housing is partly conical and partly cylindrical, and the deflection detector is arranged in the part of the housing provided with a cylindrical shell.

4. A device as in claims 2 or 3, wherein materials with different thermal expansion coefficients are used for the housing and for the receptacle.

5. A device as in claim 1, wherein the shell of the housing is a cylinder; the cylinder juts out into a boring of the receptacle; and the thermal expansion coefficient of the materials of the housing and the receptacle is chosen such that the housing can be axially displaced in the boring of the receptacle, and the shell surface of the housing and the inside of the boring of the receptacle are thereby pressed together with increasing pressure when the temperature of the reactor coolant in the reactor pressure vessel is rising.

6. A device as in claim 1, wherein, the flexible rod juts out into the cup-shaped end of the guide tube, where the flexible rod is connected to a yoke, and the yoke can be subjected to a preset pressure via a compression spring supported by the cover, and a clearance is maintained between the yoke and the bottom of the cup-shaped end of the guide tube provided that there is a coupling connection between the receptacle and the housing.

7. A device as in claim 1 wherein the flexible rod juts out into the cup-shaped end of the guide tube, where the flexible rod is connected to a piston, and the piston is displaceable together with the flexible rod within the cup shaped end of the guide tube, which acts as a cylinder, and the piston can be subjected to various pressures to control the movement of the housing between its position in the receptacle and in the guide tube outside the pressure vessel during operation of the reactor.

8. A device as in claim 7, wherein the piston side facing the reactor presure vessel is constantly subjected to the pressure prevailing in the reactor pressure vessel, and the opposite piston side can be subjected to a pressure above or below this pressure.

9. A device as in claim 8, wherein the space above the piston side facing away from the reactor pressure vessel is selectively connected to the seal water supply of the reactor coolant pump and its suction side.

10. A device as in claim 1, wherein the guide tube end facing away from the internals juts out into a pipe stub penetrating the reactor pressure vessel cap and sealed to the outside, and a control rod drive mechanism is used for displacing the housing via the flexible rod connected to the housing for periodic vibration measurement during the operation of the reactor.

* * * * *